United States Patent
Tanaka et al.

(10) Patent No.: US 7,053,794 B2
(45) Date of Patent: May 30, 2006

(54) PARKING ASSIST DEVICE AND METHOD FOR ASSISTING PARKING

(75) Inventors: Yuu Tanaka, Kariya (JP); Yoshifumi Iwata, Anjo (JP); Tomohiko Endo, Toyota (JP); Hisashi Satonaka, Susono (JP); Mitsuhiko Morita, Shizuoka-ken (JP); Seiji Kawakami, Susono (JP); Katsuhiko Iwazaki, Shizuoka-ken (JP); Hiroaki Kataoka, Susono (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 96 days.

(21) Appl. No.: 10/339,384

(22) Filed: Jan. 10, 2003

(65) Prior Publication Data
US 2003/0151526 A1 Aug. 14, 2003

(30) Foreign Application Priority Data
Jan. 10, 2002 (JP) ........................................ 2002-003784

(51) Int. Cl.
*B60Q 1/48* (2006.01)

(52) U.S. Cl. ..................... 340/932.2; 340/903; 340/436; 340/549; 340/901; 340/937; 340/437; 340/438; 701/119; 701/36; 701/45; 701/117; 701/41; 701/300; 701/310

(58) Field of Classification Search .............. 340/932.2, 340/903, 436, 549, 901, 937, 437, 438; 701/119, 701/36, 45, 117, 1, 41, 300, 310, 302
See application file for complete search history.

(56) References Cited

U.S. PATENT DOCUMENTS

| | | | | |
|---|---|---|---|---|
| 6,476,730 B1 | * | 11/2002 | Kakinami et al. | 340/932.2 |
| 6,483,442 B1 | * | 11/2002 | Shimizu et al. | 340/932.2 |
| 6,564,123 B1 | * | 5/2003 | Hahn et al. | 701/1 |
| 6,621,421 B1 | * | 9/2003 | Kuriya et al. | 340/932.2 |
| 6,654,670 B1 | * | 11/2003 | Kakinami et al. | 701/1 |
| 6,825,880 B1 | * | 11/2004 | Asahi et al. | 348/333.02 |
| 2002/0084916 A1 | | 7/2002 | Shimizu et al. | |

FOREIGN PATENT DOCUMENTS

| | | |
|---|---|---|
| JP | 11-208420 A | 8/1999 |
| JP | 2001-322519 A | 11/2001 |
| JP | 2002-240662 A | 8/2002 |

* cited by examiner

*Primary Examiner*—Tai T. Nguyen
(74) *Attorney, Agent, or Firm*—Burns, Doane, Swecker & Mathis, LLP (57) ABSTRACT

A parking assist device (1) includes a camera (3) for capturing an image of an exterior of a vehicle, and a monitor (4) for displaying the captured image, and sets a target parking position by moving a target parking frame (11) displayed on a screen of the monitor (4). A default position of the target parking frame (11) is determined based on a target parking position (P2) which is a relative position with respect to a parking preparation position (P1). The target parking position (P2) is estimated based on a running state of the vehicle until the vehicle reaches the parking preparation position (P1).

15 Claims, 5 Drawing Sheets

PARKING ASSIST DEVICE AND METHOD FOR ASSISTING PARKING

BACKGROUND OF THE INVENTION

1. Field of Invention

The invention relates to a parking assist device and a method for assisting parking.

2. Description of Related Art

When a driver operates a vehicle, it is relatively difficult to park a vehicle such as backing the vehicle into the garage and executing parallel parking. Especially; a beginning driver is likely to have difficulty in a vehicle operation at the time of parking the vehicle. Then, a parking assist device for assisting the operation at the time of parking the vehicle is known. As the parking assist device of this type, a parking guide device is disclosed in Japanese Patent Laid-Open Publication No. 11-208420. After the vehicle is temporarily stopped at the side of the target parking position, the parking guide device guides the vehicle to a target parking position by capturing a target parking area from a side of the target parking position and superimposing a target parking frame obtained by computation on the captured camera image.

However, using the parking guide device disclosed in the above-mentioned publication, a camera for capturing a target parking area from a side of the target parking position, and a camera for capturing an image of an outside area in back of the vehicle while parking it are indispensable. Thus, a need for a plurality of cameras increases a cost.

In addition, using the parking assist device disclosed in the publication, the vehicle needs to be temporarily moved to in front of the target parking position, which causes an unnecessary move of the vehicle. This deteriorates the convenience of the driver.

Meanwhile, when the parking assist is started, a default display of a target parking frame which shows the target parking position may be only displayed on a right side or a left side of the vehicle on a screen of a vehicle-installed monitor, and the target parking position may be set while moving and adjusting the target parking frame by target parking position setting means. However, in this method, it takes a long time to set the target parking position when the default display of the target parking frame is far from the target parking position.

SUMMARY OF THE INVENTION

It is an object of the invention to make it possible to assist parking by a regular operation of backing the vehicle into the garage, and to reduce a setting time of a target parking position by default-displaying a target parking frame at a position as close as possible to the target parking position to save the trouble of modifying the position of the target parking frame.

A first aspect of the invention relates to a parking assist device which includes image capturing means for capturing an area outside the vehicle and displaying means for displaying a captured image, and assists an operation of parking executed by a driver by displaying a target parking frame on a screen of the displaying means. The parking assist device estimates the target parking position which is a relative position with respect to a parking preparation position based on a running state of the vehicle until the vehicle reaches the parking preparation position, and determines an initial setting position of the target parking frame based on the estimated target parking position.

Therefore, in the first aspect of the invention, the default position of the target parking frame can be set in the vicinity of the target parking position. Therefore, the time required to set the target parking position can be reduced. Also, since a camera or the like for capturing an image of a side area of the vehicle is not required, In addition, the vehicle does not need to be temporarily moved to in front of the target parking position, which improves convenience of the driver.

It is conceivable that in a regular parking operation, when the vehicle is running until it reaches the parking preparation position, the vehicle moves straight and turns around after moving straight, and the vehicle is parked at the parking preparation position at a deflection angle with respect to the direction of moving straight.

Accordingly, it is preferable that the parking assist device calculates a deflection angle in the parking preparation position, and estimates the target parking position based on the calculated deflection angle. In this way, the target parking position can be more accurately estimated by performing a computation to estimate the target parking position based on the defection angle in the parking preparation position which is determined based on the running state of the vehicle until the vehicle reaches the parking preparation position. The deflection angle may be calculated based on a moving distance of the vehicle from a certain position to the parking preparation position. Also, the target parking position may be estimated by a different formula depending on the turning angle.

A second aspect of the invention relates to a method for assisting a parking operation by displaying an image captured by image capturing means and a target parking frame on a screen of displaying means provided inside a vehicle. In the method, a target parking position which is a relative position with respect to a parking preparation position is estimated based on the running state of the vehicle until the vehicle reaches the parking preparation position, and the initial setting position of the target parking frame is calculated based on the estimated target parking position.

BRIEF DESCRIPTION OF THE DRAWINGS

The forgoing and further objects, features and advantages of the invention will become apparent from the following description of preferred embodiment with reference to the accompanying drawings, wherein like numerals are used to represent like elements and wherein.

DETAILED DESCRIPTION OF PREFERRED EMBODIMENT

Hereafter, a preferred embodiment of the invention will be explained in detail with reference to accompanied drawings.

Figure 1:
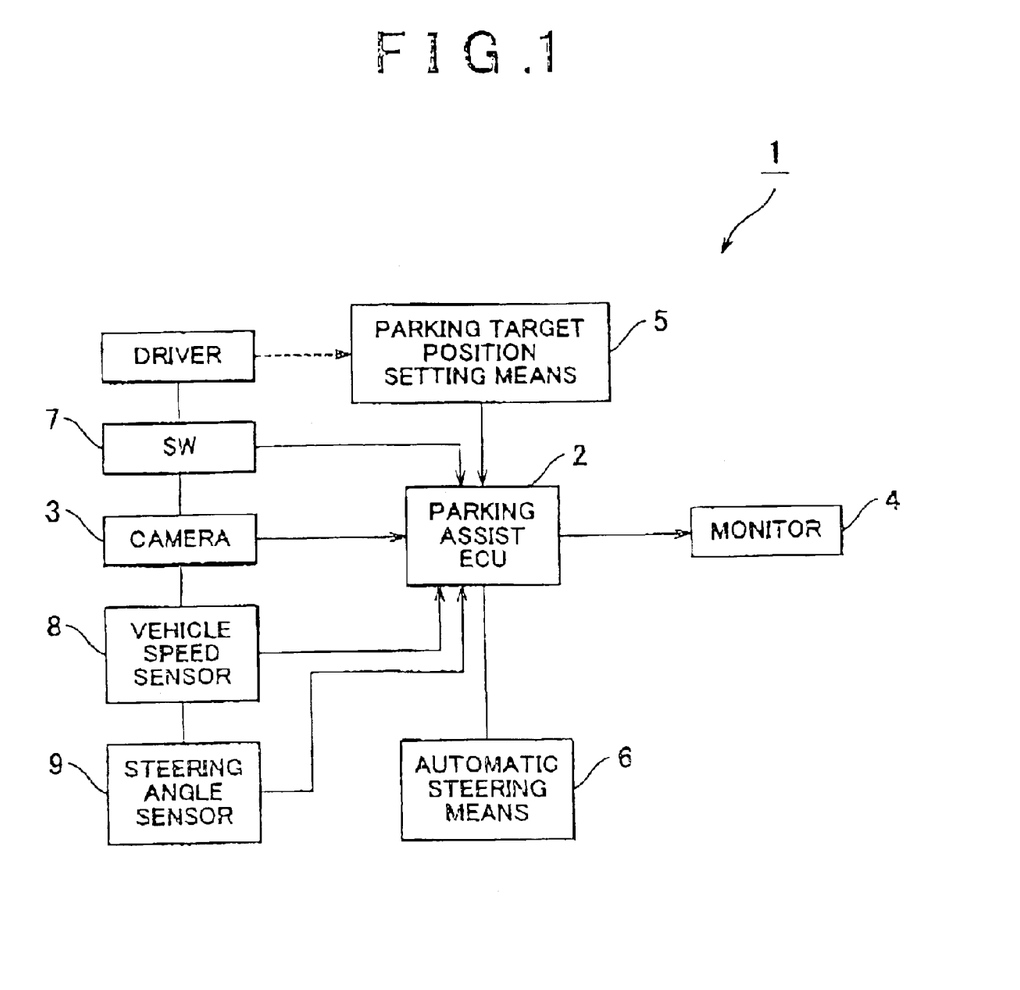
FIG. 1 is a block diagram showing a parking assist device according to an embodiment of the invention.

A parking assist device 1 according to the embodiment is mounted on a vehicle to execute parking assist when the vehicle is parked. As shown in FIG. 1, the parking assist device 1 includes a parking assist ECU 2, which is an electronic control unit. The parking assist ECU 2 controls the whole parking assist device 1. The parking assist ECU 2 is provided with a CPU, a ROM, a RAM, an input signal circuit, an output signal circuit, a power circuit, or the like, and stores various control routines including a parking assist control routine.

A camera 3, a monitor 4, and target parking position setting means 5 are connected to the parking assist ECU 2. The camera 3 can be regarded as image capturing means of the invention. The monitor 4 can be regarded as displaying means of the invention.

The camera 3 includes, for example, a wide-angle lens which is arranged in a rear portion or a side portion of the vehicle, and captures an image of an outside area in back of the vehicle. The image captured by the camera 3 is displayed on a screen of the monitor 4. The camera 3 may capture the image of the area in back of the vehicle at all the times, or may start capturing the image when the vehicle is backed up in order to reduce power consumption. Vehicle's backing up can be detected, for example, by a fact that a shift lever is placed in a reverse range.

Figure 2:
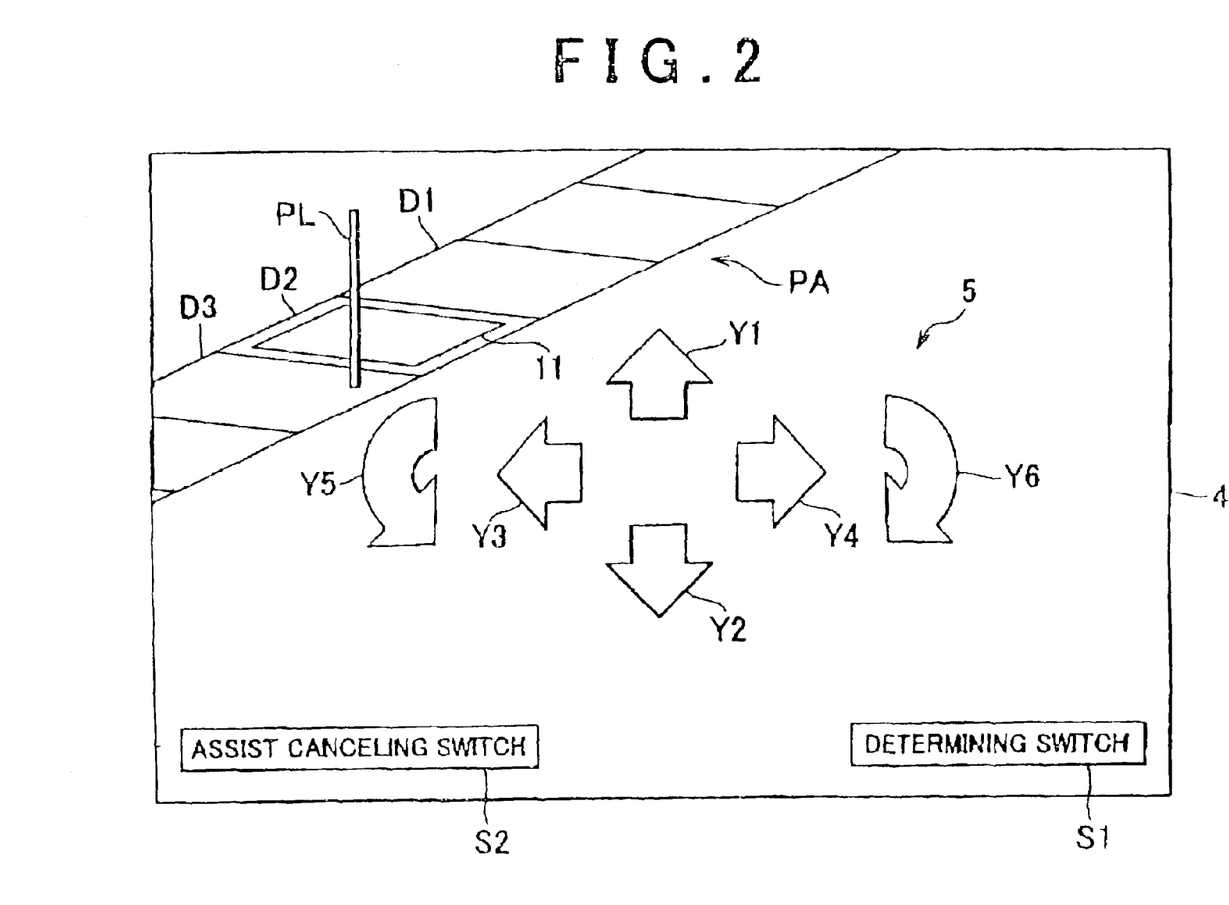
FIG. 2 is a diagram showing an image displayed on a monitor.

The monitor 4 is arranged inside the vehicle, for example, at a position which is within sight of the driver, in an instrument panel. As shown in FIG. 2, in addition to the image captured by the camera 3, a target parking frame 11 which shows a target parking position displayed at a position determined by the parking assist ECU 2, a pole P1 for confirming a safe condition and the like are displayed on the screen of the monitor 4. Note that since the wide-angle lens is provided to the camera 3, a peripheral portion of an actual image is deflected. However, the image in FIG. 2 is shown straight in order to facilitate an understanding of an explanation.

As shown in FIG. 2, target parking position setting means 5 is a touch panel type and is displayed on a screen of the monitor 4, and includes arrows Y1 to Y4 in a vertical direction or a lateral direction, and rotational arrows Y5, Y6 which curve in a clockwise direction or a counterclockwise direction. By touching these arrows Y1 to Y6, a target parking frame 11 which is determined in advance, and also displayed on the screen of the monitor 4 along with the image captured by the camera 3 is rotated and moved to set the target parking position. Note that when a default position display of the target parking frame 11 corresponds to a position corresponding to the target parking position, the target parking position is set without the need for touching the arrows Y1 to Y6 of the target parking position setting means.

Also, a determining switch S1 which the driver touches when the driver judges that the default position display of the target parking frame 11 has corresponded to the position corresponding to the target parking position, and an assist canceling switch S2 which the driver touches when the driver wants to cancel parking assist in midstream are displayed on the screen of the monitor 4. The parking assist is started by touching the determining switch S1, and the parking assist is canceled by touching the assist canceling switch S2.

Further, as shown in FIG. 1, automatic steering means 6 and a starter switch 7 for switching ON/OFF of parking assist mode are connected to the parking assist ECU 2. The automatic steering means 6 is provided with an actuator for steering a steering wheel of the vehicle, and receives a control signal from the parking assist ECU 2 to steer the steering wheel. Also, the starter switch 7 is mounted on, for example, the instrument panel. In a state where the starter switch 7 is ON, when an assist start condition is established, that is, for example, when the shift lever (not shown) is put into the reverse range, a mode is switched to the parking assist mode to start certain processing of the parking assist. Alternatively, in a state where the starter switch 7 is OFF, even when the shift lever is put into the reverse range and the assist start condition is established, the mode is not switched to the parking assist mode and the processing of the parking assist is not executed. Therefore, for example, when the driver is skilled enough and does not need to use such parking assist device 1, the starter switch 7 may remain OFF.

Also, a vehicle speed sensor 8 and a steering angle sensor 9 are connected to the parking assist ECU 2. The vehicle speed sensor 8 includes, for example, an active wheel vehicle speed sensor which is mounted on a wheel (not shown) of the vehicle, and detects a rotational speed of the wheel to output a speed signal to the parking assist ECU 2. In the parking assist signal ECU 2, a mileage of the vehicle is calculated based on the speed signal output from the vehicle speed sensor 8. Also, the steering angle sensor 9 is mounted on, for example, a steering shaft (not shown) of the vehicle, detects a rotation angle of a steering, and outputs the detected rotation angle signal to the parking assist ECU 2. In the parking assist ECU 2, a steering angle of the steering wheel is calculated based on the detected rotation angle signal of the steering.

An operation of the parking assist device according to the embodiment will be explained, as follows.

Figure 3:
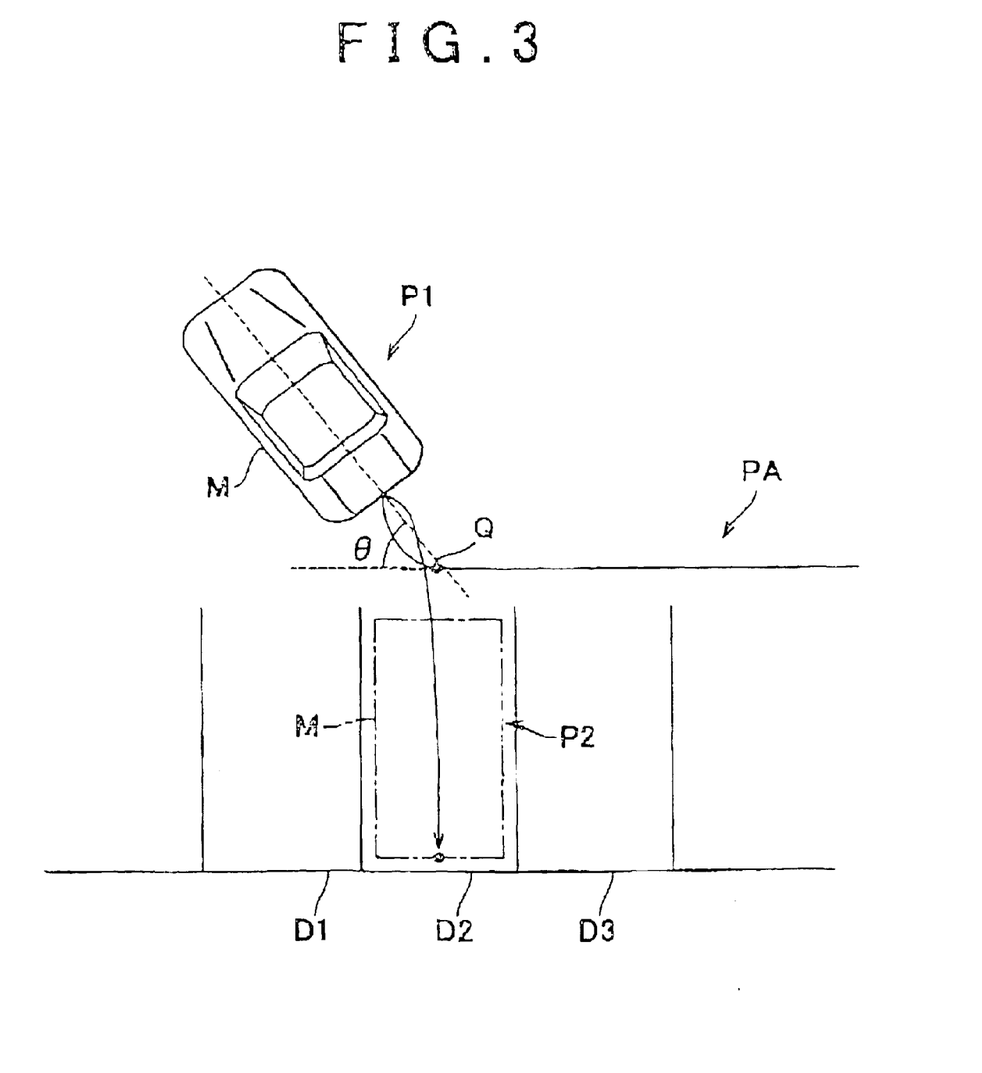
FIG. 3 is a plane view showing a state in which the vehicle moves to a target parking area.

In the embodiment, as shown in FIG. 3, an example in which a vehicle M is parked into a parking section D2 of a parking lot PA whose area for parking vehicles is partitioned into parking sections D1, D2, D3, . . . by a partitioning line will be explained.

In a state where the starter switch 7 is ON, when a driver of the vehicle M, with the intention of parking the vehicle into the parking section D2, passes in front of the target parking position, turns the vehicle such that a rear portion of the vehicle M faces the parking section D2 to move the vehicle M to a parking preparation position P1, and puts the shift lever (not shown) in a vehicle compartment into the reverse range, the mode is switched to the parking assist mode. When the mode is switched to the parking assist mode, the camera 3 is turned ON first, and an image of an area in back of the vehicle is read by the camera 3. The image read by the camera 3 is output to the monitor 4 through the parking assist ECU 2, and displayed on the screen of the monitor 4, as shown in FIG. 2. When the image is displayed on the screen of the monitor 4, a target parking position P2, shown in FIG. 3, in a longitudinal rectangular shape which is corresponding to a form obtained when the vehicle M is seen from the top is set.

In order to set the target parking position P2, a target parking frame 11 is displayed at a default display position on the screen of the monitor 4 first. The driver touches the arrows Y1 to Y6 in the target parking position setting means 5 as required while looking at the target parking frame 11, to move the target parking frame 11, and ultimately set the target parking position P2. In the embodiment, when the default position of the target parking frame 11 at this time is determined, a computation for estimating the target parking position P2 (a relative position with respect to the parking preparation position P1) is executed, and the default position of the target parking frame 11 is determined based on the estimated target parking position P2. The target parking position P2 is estimated based on a running state of the vehicle which is obtained before the vehicle M reaches the parking preparation position P1.

When the parking operation is executed, a behavior of the vehicle M before reaching the parking preparation position P1 is usually as shown in FIG. 3. First the vehicle M comes close to a position in front of the parking section D2 where the driver intends to park the vehicle, white moving straight ahead. A moving direction of the vehicle M at this time is usually along a width direction of the parking section D2. Secondary, the vehicle M passes in front of the parking section D2. At this time, from a base point Q which is at a front position of the parking section D2, the vehicle M turns and moves, for example, in a clockwise direction to the parking preparation position P1 while proceeding in a direction of moving away from the parking section D2 by a certain deflection angle (a turning round angle with respect to an immediately preceding direction of moving straight) with a certain turning radius. Next, the vehicle M turns and moves while backing up in the clockwise direction with the certain turning radius. Then, the vehicle M finally straight backs up to the target parking position P2.

The target parking position P2, which is a relative position with respect to the parking preparation position P1, is estimated based on a running state (a track of the vehicle) by such a regular backing of a vehicle into a garage. More specifically, the target parking position P2 is estimated as follows; assuming that the vehicle M moves straight and turns around so as to execute such a regular parking as mentioned above when the vehicle M moves to the parking preparation position P1, a deflection angle θ (refer to FIG. 4) of the vehicle M is determined from the moving distance and the turning radius of the vehicle, while the vehicle is turning. The moving distance is determined based on a signal from the vehicle speed sensor 8, and the turning radius is determined from an amount of steering of the steering wheel which is determined based on a signal from the steering angle sensor 9.

In this case, assuming that a minute moving distance and the turning radius of the vehicle M while the vehicle is turning are respectively ds and R, the deflection angle θ is determined by a following formula (1).

$$\theta = \int_{-5.0}^{0} 1/R \cdot ds \qquad (1)$$

In the formula (1), an integration interval is −5 to 0 m. A variation of a direction of the vehicle which is caused by the vehicle's moving by 5 m until the vehicle reaches the present position is determined by the formula. The above set moving distance, i.e., 5 m may be changed in accordance with a vehicle speed as required. Also, the parking assist ECU 2 executes a straight judgement which by it is whether the vehicle M has moved straight. When it is judged that the vehicle M has moved straight as a result of the straight judgement, the deflection angle θ; which is determined by the formula (1), is cleared. In the straight judgement, for example, when the vehicle has run for 2 m, for example, with a steering maintained substantially straight (a steering angle of the steering is within ±30 degrees), it is judged that the vehicle has run straight. Therefore, when the vehicle moves straight before starting turning, the deflection angle θ is accurately determined.

Figure 4:
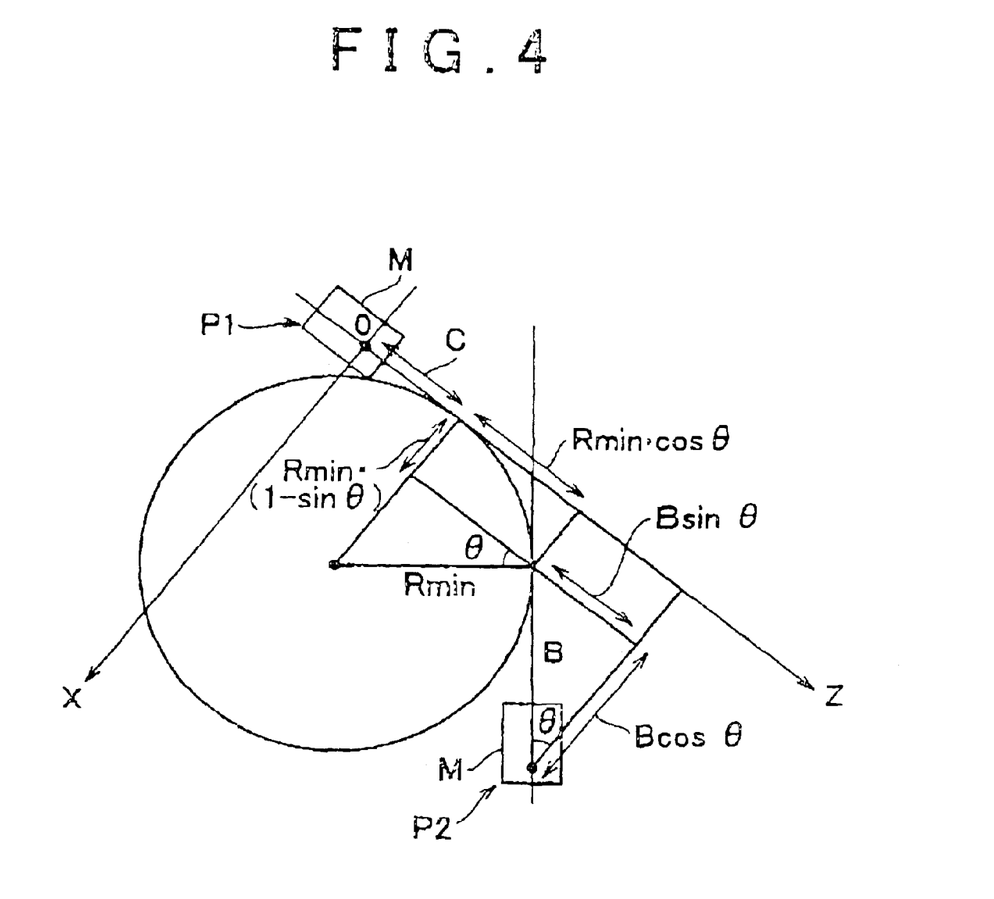
FIG. 4 is an explanatory view explaining the target parking position which is a relative position with respect to a parking preparation position.

After the deflection angle θ is determined, the target parking position P2 is determined in an X-Z coordinate system whose X-axis and Z-axis are respectively a lateral direction and a longitudinal direction of the vehicle M with respect to a position of the vehicle M, as shown in FIG. 4. Formulas for calculating the target parking position P2 vary depending on degrees of the deflection angles θ.

First, when the deflection angle θ is equal to or larger than 0 and less than 30 degrees ($0 \leq \theta < 30$), a moving amount in an X direction and a moving amount in a Z direction are determined by the following formulas (2) and (3).

$$X = R\min \cdot (1.0 - \sin \theta) + B \cdot \cos \theta \qquad (2)$$

$$Z = C + R\min \cdot \cos \theta + B \cdot \sin \theta \qquad (3)$$

Note that following are adaptation constants; Rmin=4.05 (m), B=2.0 (m), C=1.0(m).

When the vehicle is backed into the garage, the track of the vehicle can usually be set on the assumption that first the vehicle backs up straight, then moves back while turning, and backs up straight again. The adaptation constant B corresponds to the vehicle's last straight backing up, and the adaptation constant C corresponds to the vehicle's first straight backing up so as to obtain such a track. Also, the adaptation constant Rmin is a turning radius which is obtained when the vehicle backs up while turning, and, for example, a turning radius which is obtained when steering is made to the fullest extent. These adaptation constants are set based on an entire length, a full width, a wheel base, other features, or the like of the vehicle M, as required.

When the vehicle moves, a moving amount in the X direction at the time of first straight backing up is 0, a moving amount in the X direction at the time of backing up while turning around is Rmin·(1.0−sin θ), and a moving amount in the X direction at the time of last straight backing up is B·cos θ. Therefore, as a moving amount in the X direction, the formula (2) is derived by adding these values. Also, a moving amount in the Z direction at the time of first straight backing up is C, a moving amount in the Z direction at the time of backing up while turning is Rmin·cos θ, and a moving amount in the Z direction at the time of last straight backing up is B·sin θ. Therefore, as a moving amount in the Z direction, the formula (3) is derived by adding these values together.

Note that when the deflection angle θ is 0 degree (θ=0), it is preferable to set in advance whether a target parking frame 11 is displayed on a right side or a left side of the vehicle on the screen of the monitor based on whether the vehicle M is parked on a right rear side or a left rear side of the vehicle, since the vehicle M does not turn around.

Secondly, when the deflection angle θ is equal to or larger than 30 degrees and less than 50 degrees ($30 \leq \theta < 50$), a moving amount in the X direction can be determined by the formula (2) as well as in the case where the deflection angle is equal to or larger than 0 degree and less than 30 degrees. Also, a moving amount in the Z direction can be determined by the following formula (4).

$$Z = 5.5 + 0.05 \cdot (\theta - 30) \qquad (4)$$

When the deflection angle θ is equal to or larger than 30 degrees, the moving amount in the Z direction increases proportionately with the deflection angle θ. Accordingly, within a range where the deflection angle θ is equal to or larger than 30 degree and less than 50 degrees, the moving amount in the Z direction linearly increases in accordance with increases in the deflection angle θ, as shown by the formula (4).

In addition, when the deflection angle θ is equal to or larger than 50 degrees ($50 \leq \theta$), the moving amount in the X direction can be determined by the formula (2) as in the case where the deflection angle θ is equal to or larger than 0 degree and less than 30 degrees. Also, the moving amount in the Z direction can be determined by a following formula (5).

$$Z = 6.5 \quad (5)$$

When the vehicle is backed to the garage, the deflection angle θ is usually approximately 20 degrees, and even when the deflection angle θ is large, it is approximately 30 degrees. Also, when the deflection angle θ increases to equal to or larger than 50 degrees, there is almost no variations in the moving amount in the Z direction. The target parking position P2 can be estimated with substantially high accuracy by fixing the moving amount in the Z direction at 6.5 m and defining a maximum value.

Figure 5:
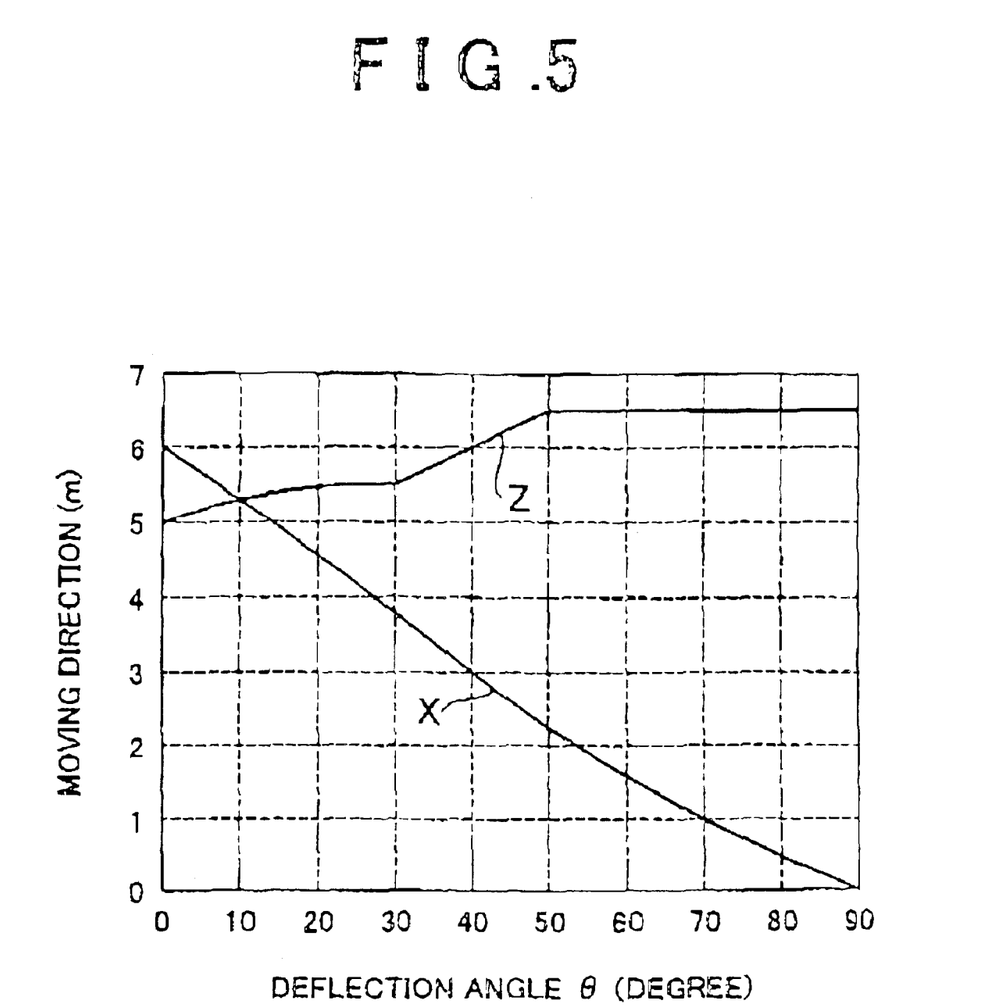
FIG. 5 is a graph showing a relation between a deflection angle and a moving distance of the vehicle in an X direction and a Z direction.

FIG. 5 shows a relation between the deflection angle θ which is calculated by the formulas (2) to (5), and moving distances in the X direction and the Z direction.

After the target parking position P2 is estimated in the above-mentioned manner, the default position of the target parking frame 11 is determined based on the estimated target parking position P2. Then, the target parking frame 11 is displayed at the determined default position.

After the target parking frame 11 is displayed on the screen of the monitor 4, the driver touches the arrows Y1 to Y6 in the target parking position setting means 5 as required to modify and set the target parking position. At this time, the default display position of the target parking position 11 is in the vicinity of the target parking position P2, which saves the driver the trouble of moving the target parking frame 11 when the driver sets the target parking position P2. Accordingly, the setting time can be reduced.

When the target parking position P2 is set, the parking assist ECU 2 judges whether a track from the parking preparation position P1 to the target parking position P2 can be drawn based on a relative positional relation between the parking preparation position P1, which is a current position of the vehicle M, and the set target parking position P2. Then, when the parking assist ECU 2 judges that the track cannot be drawn, it displays the target parking frame 11 in red as well as displaying a comment "guidance is not available" on the screen of the monitor 4. On the contrary, when the parking assist ECU 2 judges that the track can be drawn, it displays the target parking frame 11, for example, in green which is different from red as well as displaying a determining switch S1 on the screen of the monitor 4. After the determining switch S1 is displayed, the driver checks whether or not an obstacle such as another vehicle is on the track connecting the parking preparation position P1 to the target parking position P2. Then, after confirming that there is no obstacle, the driver touches the determining switch S1. When the driver touches the determining switch S1, the parking assist is started. When the parking assist is started, the steering operation by the driver is no longer required since the automatic steering means 6 is activated. Then, the driver can execute the parking operation with the parking assist by adjusting the vehicle speed as required. After that, the vehicle is guided to the target parking position P2 to complete the control.

Also, during the above-mentioned operation, the assist canceling switch S2 is displayed on the screen of the monitor 4. When the driver takes an action, such as touching the assist canceling switch S2, pressing down on the accelerator or operating the steering, to satisfy the assist canceling condition, the parking assist is cancelled at that point in time.

As mentioned above, in the parking assist device according to the embodiment, since the camera for capturing the image of the side area of the vehicle is not required, the increase in cost due to mounting the extra camera can be avoided. Also, since the regular operation of backing the vehicle into the garage is conceived as the parking operation, an unnecessary operation, such as temporarily stopping the vehicle in front of the target parking position does not need to be executed. Therefore, the vehicle can be parked by executing the backing up operation only once, which enhances the convenience of the driver. In addition, the position of the default display of the target parking frame which shows the target parking position on the screed is determined based on the estimated relative positional relation between the parking preparation position and the target parking position. Accordingly, the target parking frame can be default-displayed at the substantially accurate target parking position, which facilitates the driver's setting of the target parking position which is executed at the parking preparation position. This reduces the time required to set the target parking position.

While the preferred embodiment of the invention has been explained, the invention is not limited to the above-mentioned embodiment. Also, in the embodiment, automatic steering means is provided. However automatic braking means or automatic driving means in addition to the automatic steering means may be provided such that the driver can execute the parking operation without executing a vehicle speed adjustment operation. As a matter of course, one or two of the above-mentioned means may be provided such that the driver can execute the parking assist.

As mentioned above, using the parking assist device according to the embodiment, the parking can be assisted by the regular operation of backing the vehicle into the garage when the parking of the vehicle is assisted. Also, the setting time of the target parking position can be reduced by default-displaying the target parking frame at a position as close as possible to the target parking position to save the driver the trouble of modifying the position of the target parking frame.

What is claimed is:

1. A parking assist device comprising image capturing means for capturing an image of an area outside a vehicle, displaying means for displaying the captured image, with a target parking frame displayed on a screen of the displaying means to assist a parking operation executed by a driver of the vehicle, estimating means for estimating a target parking position which is a relative position with respect to a parking preparation position based on a running state of the vehicle until the vehicle reaches the parking preparation position without stopping in front of the target parking position, and calculating means for calculating an initial setting position of the target parking frame based on the estimated target parking position.

2. The parking assist device according to claim 1, wherein
    the running state includes a moving straight and a turn after moving straight, and the estimating means calculates a deflection angle between a moving straight direction and a direction of the vehicle at the parking preparation position based on the running state, and estimates the target parking position based on the calculated deflection angle.

3. The parking assist device according to claim 2, wherein
the estimating means calculates the deflection angle based on a moving distance of the vehicle from a certain position to the parking preparation position.

4. The parking assist device according to claim 3, where
formulas for estimating the target parking position vary depending on degrees of the calculated deflection angle.

5. A The parking assist device according to claim 2, wherein
formulas for estimating the target parking position vary depending on degrees of the calculated deflection angle.

6. The parking assist device according to claim 2, wherein the estimating means calculates the deflection angle when the vehicle passes in front of a parking section where the driver intends to park the vehicle and then turns in a direction.

7. The parking assist device according to claim 2, wherein the estimating means calculates the deflection angle when the vehicle turns at a base point located in front of a parking section where the driver intends to park the vehicle and moves in a direction away from the parking section.

8. The parking assist device according to claim 2, wherein the estimating means calculates the deflection angle based on a moving distance and a turning radius of the vehicle.

9. The parking assist device according to claim 1, wherein the target parking position is estimated when the vehicle travels straight and turns to move towards the parking preparation position.

10. A method for assisting a parking operation by displaying an image captured by image capturing means and a target parking frame on a screen of provided inside a vehicle comprising
estimating a target parking position which is a relative position with respect to a parking preparation position based on a running state of the vehicle until the vehicle reaches the parking preparation position without stopping in front of the target parking position, and
calculating an initial setting position of the target parking frame based on the estimated target parking position.

11. The method according to claim 10, comprising estimating the target parking position by calculating a deflection angle between a moving straight direction and a direction of the vehicle at the parking preparation position based on the running state.

12. The method according to claim 11, wherein the deflection angle is calculated when the vehicle passes in front of a parking section where the driver intends to park the vehicle and then turns in a direction.

13. The method according to claim 11, wherein the deflection angle is calculated when the vehicle turns at a base point located in front of a parking section where the driver intends to park the vehicle and moves in a direction away from the parking section.

14. The method according to claim 10, wherein the target parking position is estimated when the vehicle travels straight and turns to move towards the parking preparation position.

15. The method according to claim 11, wherein the deflection angle is estimated based on a moving distance and a turning radius of the vehicle.

* * * * *